United States Patent [19]

Sparvieri et al.

[11] Patent Number: 5,142,150

[45] Date of Patent: Aug. 25, 1992

[54] HORIZON SENSOR FOR SATELLITES USING SUPERCONDUCTOR(S) HAVING A HIGH CRITICAL TEMPERATURE

[75] Inventors: Nicola Sparvieri; Filippo Graziani, both of Rome, Italy

[73] Assignee: Selenia Industrie Elettroniche Associate S.p.A., Rome, Italy

[21] Appl. No.: 616,791

[22] Filed: Nov. 21, 1990

[30] Foreign Application Priority Data

Nov. 24, 1989 [IT]  Italy ................ 48596 A/89

[51] Int. Cl.⁵ ............................ B64G 1/36
[52] U.S. Cl. ..................... 250/336.2; 244/3.16; 244/171; 250/342; 505/848; 505/849
[58] Field of Search ................ 250/342, 336.2; 244/3.16, 171; 505/849, 848, 701

[56] References Cited

U.S. PATENT DOCUMENTS 4,464,065 8/1984 Wolf et al. ................ 374/121

FOREIGN PATENT DOCUMENTS 622367 6/1983 U.S.S.R. ................ 357/5

OTHER PUBLICATIONS

R. H. Anderson, "14-16 micron Horizon Sensors for Spinning Satellites" Conference: *Proceedings of the SPIE 14 Annual Technical Symposium: Photo-Optical Instrumentation Applications and Theory*, San Francisco, Calif., USA (Aug. 11-14, 1969) pp. 85-91.

Norman M. Hatcher, "A Survey of Attitude Sensors for Spacecraft" National Aeronautics and Space Administration NASA SP-145 (1967).

Talvacchio, J. et al., "Photodetection with High-$T_c$ Superconducting Films", pp. 449-458 in *Science and Technology in Thin Film Superconductors*, McConnell Robert D. and Wolf, Stuart D., eds. (1989) (Proceedings of the Conference on Science and Technology of Thin Film Superconductors, held Nov. 14-18, 1988, Colorado Springs, Co.).

Index from *IEEE Transactions on Magnetics*, vol. 25 (2) (Mar. 1989).

Young, B. A. "Phonon-Mediated Detection of X-Rays in Silicon Crystals Using Superconducting Transition Edge Phonon Sensors", *IEEE Transactions on Magnetics*, pp. 1347-1350, vol. 25 (2) (Mar. 1989).

Forrester, M. G., "Optical Response Of Epitaxial And Granular Films Of $YBa_2Cu_3O_{7-\delta}$ At Temperatures From 25° K to 100° K", *IEEE Transactions on Magnetics*, pp. 1327-1330, vol. 25 (2) (Mar. 1989).

Sauvageau, J. E., "Superconducting Kinetic Inductance Bolometer", *IEEE Transactions on Magnetics*, pp. 1331-1334, vol. 25 (2) (Mar. 1989).

Richards, P. L., "The High $T_c$ Superconducting Bolometer", *IEEE Transactions on Magnetics*, pp. 1335-1338, vol. 25 (2) (Mar. 1989).

Primary Examiner—Constantine Hannaher
Attorney, Agent, or Firm—Cohen, Pontani, Lieberman & Pavane

[57] ABSTRACT

A horizon sensor for spaced-based satellites consisting of a high critical temperature superconductor which changes temperature based upon its exposure to space-based radiation. The horizon sensor may be flexibly positioned along the outer surface of the space-based satellite. As the orientation in space of the satellite varies, certain portions of the satellite body will be alternately exposed to radiation while other portions of the satellite body will be shadowed from it. As the sensor is exposed to radiation due to the change in orientation of the satellite body, the temperature of the superconductor changes due to radiation absorption. This change in temperature causes the conductivity of the superconductor within the sensor to vary, and this causes a change in voltage within the sensor. This voltage may be appropriately processed via land based or satellite based control systems to accurately measure and/or change the orientation of the satellite in space.

7 Claims, 2 Drawing Sheets

HORIZON SENSOR FOR SATELLITES USING SUPERCONDUCTOR(S) HAVING A HIGH CRITICAL TEMPERATURE

FIELD OF THE INVENTION

The present invention is directed to a horizon sensor used on the outer surface of space-borne satellites to detect the satellite's orientation with respect to the earth. The sensor uses as a primary sensing element a high critical temperature superconductor, preferably in thin film form, which changes its resistivity upon passing from a high temperature, through the critical temperature of the superconductor (approximately 90° to 125° K.), to lower temperatures and vice versa. The temperature change is brought about when the external surface of the satellite upon which the sensor is mounted moves from a position in which the surface is reached by radiation (light and/or infrared radiation) to a shadow zone as a result of the satellite's rotation.

BACKGROUND OF THE INVENTION

Space based satellites currently make use of a number of sensing devices which can be used to monitor the satellite's orientation in space, and horizon sensors specifically are used to monitor the rotation of the satellite so as to allow unwanted rotations to be corrected. Such monitoring of the satellite's position and rotation is typically performed by placing a number of sensors along the outer perimeter of the satellite's body. As the satellite rotates in space it will, depending on its particular position, pass through zones of light and shadow as a result of light or infrared radiation.

Currently known sensors for detecting satellite position fall into three main categories, all of which possess certain disadvantages.

Some horizon sensors are implemented using photodiodes. These photodiode based sensors have a radiation detection spectrum which ranges from 0.4 to 0.7 $\mu m$ in wavelength. These photodiode sensors, however, have proven to be unreliable when used for the duration of service required in space-based satellites. An additional disadvantage to these system is that such photodiodes exhibit a low resistance to harmful ionizing radiation which is commonly encountered in space.

Another common sensor arrangement makes use of thermopiles, usually configured in an array. The thermopiles are used in conjunction with thermocouples and are normally arranged in series. Such a configuration is simple to construct and makes use of a minimum of electronic components, but is possessed of the disadvantage of having a long response time which makes them undesirable for use in critical applications.

Other horizon sensors make use of pyroelectric detectors which contain dielectric materials whose polarization properties change as a function of temperature. Such devices have fast response times but are hampered by low levels of sensitivity which make them undesirable for certain critical satellite positioning applications.

It would therefore be highly advantageous to have a space-based horizon sensor with a fast response time that is also highly sensitive to temperature variation so as to enable its use in critical space-based satellite positioning applications.

OBJECTS AND SUMMARY OF THE INVENTION

The present invention relates to a horizon sensor which can be mounted on the outer surface of a space-based satellite so as to enable critical detection of the satellite's position and orientation in space. The horizon sensor of the present invention uses a superconductor having a high critical temperature, preferably in thin film form, mounted in a cavity. As the satellite moves in space, the surface of the satellite which contains the sensor will be alternately exposed to or shielded from radiation in the form of light or infrared radiation. This alternate exposure/nonexposure cycle will cause temperature variations along the surface of the satellite depending on whether that particular surface is exposed to the radiation or shielded from it. The horizon sensor of the present invention can detect temperature variations between the satellite's illuminated surface and of the surface in shadow. These temperature variations cause a change in the conductivity value of the superconductor used in the sensor, and this change in conductivity can be used in commonly known electrical circuits to provide data which may be used by other systems in the satellite to sense the orientation of the satellite and change it if necessary. The temperature differences which are likely to be encountered as the sensor passes from exposure to radiation to shadow exposure to background radiation are in the order of 300° K.

The sensor of the instant invention can be configured so as to sense incident radiation commonly found in space, namely light and/or infrared radiation. As the sensor is alternately exposed to or shadowed from such radiation, the superconductor changes its conductivity as it passes from higher temperatures to lower temperatures. These temperatures are measured from the critical temperature of the superconductor, that being the temperature at which it attains superconductor properties. In the instant invention the superconductor possesses a high critical temperature, namely a temperature of approximately 90° to 125° K. Temperature sensing is achieved by placing the superconductor in an electrical circuit which is sensitive to resistivity changes, such that the change in resistivity of the superconductor is brought about by passage of the superconductor from a zone of higher temperatures to lower temperatures with respect to the critical temperature and vice versa as the external surface of the satellite upon which the sensor is based passes from an orientation in which it is reached by radiation to an orientation where the sensor is in shadow as a result of the satellite's rotation.

It is therefore an object of the invention to provide a superconductor based horizon sensor for use in space-based satellites.

It is a further object of the invention to provide a horizon sensor which exhibits a rapid response time for measuring temperature variations as well as a high degree of sensitivity to such temperature changes for the purpose of critical and accurate measurement of the satellite's orientation in space.

It is yet another objective of this invention to provide a sensor which utilizes a superconductor which has a relatively high critical temperture, namely approximately 90° to 125° K.

It is a further object of this invention to provide a horizon sensor with a minimum detectable signal which is limited uniquely by the thermal fluctuations which will be encountered as the sensor goes through its cycle of exposure to radiation and shadow.

It is a still further objective to provide a horizon sensor in which the sensitivity is inversely proportional to its thermal capacity.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
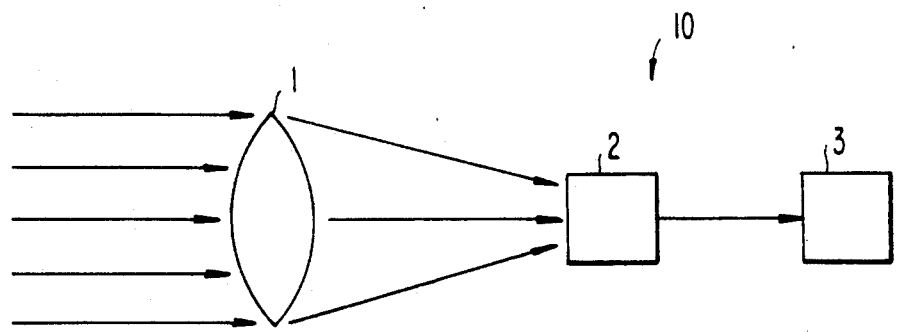
FIG. 1 illustrates a general block diagram of the horizon sensor of the instant invention.

With initial reference to FIG. 1, there is shown a basic functional block diagram of the major components of the horizon sensor 10 of the instant invention. An optical system 1 which is capable of passing space-based radiation is optically coupled to a radiation detecting element 2. This radiation detecting element 2 is capable of sensing the presence of certain types of space-based radiation, changing temperature as a result of the quantity of exposure to such radiation, and emitting a voltage which conforms to said temperature change, said voltage being fed to a signal processor 3. The optical system 1 allows for the selective passing and/or filtering of specific types and quantities of radiation, namely light and/or infrared radiation. The signal processing element 3 may be a known signal processing means which can receive voltage signals from a sensor and pass along signals to be acted upon, for the purposes of monitoring or correcting the satellite's orientation in space.

Figure 2:
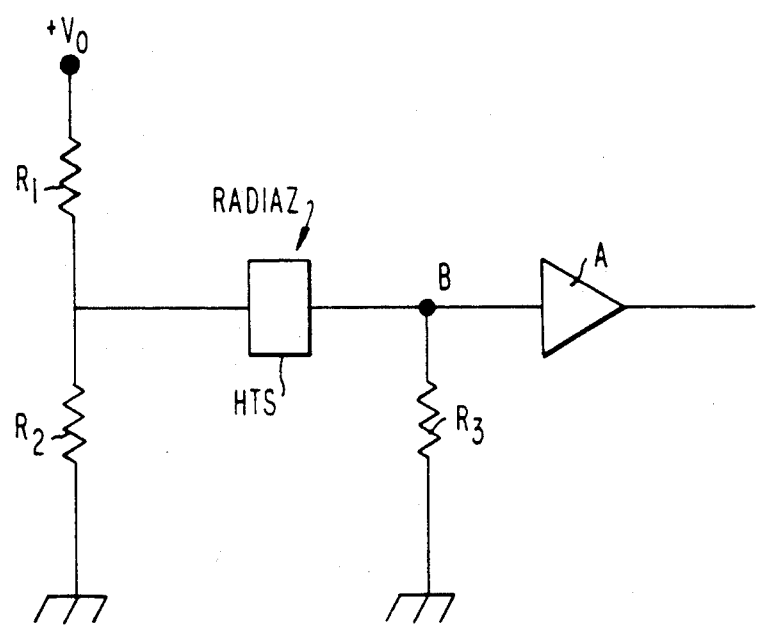
FIG. 2 shows the general circuit diagram of the horizon detector of the instant invention.

FIG. 2 is an electrical schematic showing the detailed configuration of the radiation detector element 2. FIG. 2 shows a high temperature superconductor, indicated as HTS, positioned in a commonly known resistor network. As radiation which has been passed through optical system 1 impinges upon the high temperature superconductor the superconductor will change temperature. Essentially, the high temperature superconductor reaches its lowest temperature in the absence of impinging radiation, and reaches its maximum temperature when the amount of radiation impinging upon it is at its maximum. The range of temperature difference typically encountered between the maximum temperature and minimum temperature is a range of approximately 300° K. The critical temperature for the preferred superconductor device of the present invention is approximately 90° to 125° K. This temperature range classifies the superconductor as a high critical temperature superconductor.

In the resistive network shown in FIG. 2, when voltage $V_o$ is applied to the network, the voltage appearing at point B will be at its maximum when the superconductor is at maximum conductivity. Therefore, it can be seen that as the satellite's orientation changes, thereby exposing the sensor system to greater or lesser amounts of radiation, the superconductor will change temperature as a result of the increase or decrease in the absorption of this radiation. By taking advantage of the sharp fall in resistance of the superconductor as it reaches critical temperature, the configuration of the present invention is particularly well suited for use as a radiation sensor, otherwise known as a bolometer. By placing the subject sensor in various locations on a satellite body, and measuring the differences in radiation along the various points of the satellite body, precise measuring of the particular orientation of the satellite in space as a result of the varied exposure to radiation on its surface can be obtained.

Figure 3:
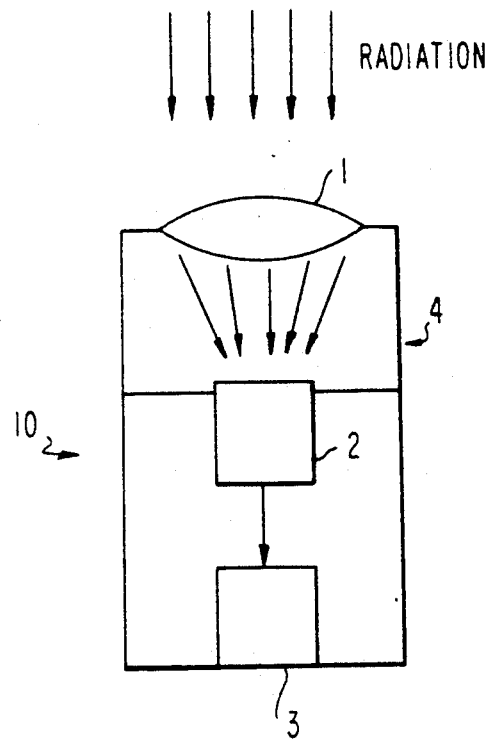
FIG. 3 depicts the sensor mounted in a sealed cavity suitable for mounting on a satellite body.
Figure 4:
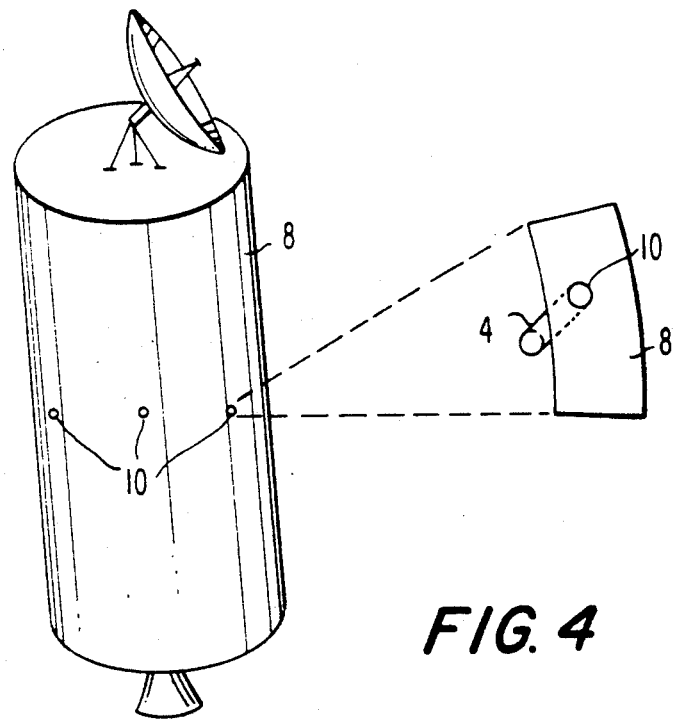
FIG. 4 shows the sensor of FIG. 3 in position on a satellite.

The sensor can be disposed along the satellite body 8 in an appropriately sized cavity as depicted in FIGS. 3 and 4, such a cavity 4 being sized for the particular radiation to be sensed, and also to provide for appropriate protection of the device from external agents as well as space-borne particles. Additionally, the cavity 4 can be sized and positioned so as to obtain the desired angular resolution of the sensor which is determined by the quantity and nature of the radiation which strikes the bottom of the cavity wherein the superconductor sensor 2 is located.

The high temperature superconductor is preferably of the thin film type, having a critical temperature in the range of approximately 90° to 125° K.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, however, therefore, to be limited only as indicated by the scope of the claims appended hereto.

We claim:

1. A horizon detector for associating horizon detection with a relative orientation of a space-based satellite that has an outer surface that is alternately exposed to an illuminated incident radiation and a shaded incident radiation as the satellite changes orientation in space, comprising:

a cavity defined in the outer surface of said satellite;

means in said cavity for sensing the amount of radiation incident on said sensing means, said sensing means comprising a high temperature superconductor having a conductivity that varies in relation to an amount of radiation impinging on said sensing means;

means disposed proximate to said cavity for transmitting incident radiation to said sensing means; and means for sensing a conductivity of said high temperature superconductor for detecting the horizon based upon a changing value of said conductance as the relative orientation of the satellite changes in space.

2. The apparatus according to claim 1, wherein said superconductor has a critical temperature at which superconductivity is reached and a variable conductivity that varies as the temperature of said superconductor varies about said critical temperature, said temperature of said superconductor varying as said satellite changes orientation and is exposed to said illuminated incident radiation and said shaded incident radiation and thereby changes the amount of radiation impinging upon said superconductor, such that said temperature falls below said critical value when said outer surface of said satellite is exposed to said shaded incident radiation, and said temperature rises to a value higher than said critical temperature when said outer surface is exposed to said illuminated incident radiation.

3. The apparatus according to claim 2, wherein said critical temperature is in the range of about 90° to 125° K.

4. The apparatus according to claim 1, wherein said superconductor is a thin film superconductor having a sensitivity inversely proportional to its thermal capacity.

5. The apparatus according to claim 1, wherein said radiation collecting means comprises means for selectively filtering radiation so as to enable selection of a radiation that may be incident upon said superconductor.

6. The apparatus according to claim 1, wherein said cavity includes means for protect said cavity from external agents and means for limiting an angular resolution of radiation which is incident on said superconductor.

7. The apparatus according to claim 6, wherein said radiation collecting means comprises means for selectively filtering radiation so as to enable selection of a radiation that may be incident upon said superconductor.

* * * * *